Jan. 13, 1970 A. B. HOLMES Re. 26,765

ENGINE COOLING SYSTEM WITH VACUUM RELIEF DEVICE

Original Filed Nov. 24, 1965

INVENTOR

ALLIE B. HOLMES

BY Arnold, Roylance, Kruger and Durkee

ATTORNEYS

United States Patent Office

Re. 26,765
Reissued Jan. 13, 1970

26,765

ENGINE COOLING SYSTEM WITH VACUUM RELIEF DEVICE

Allie B. Holmes, Corpus Christi, Tex., assignor, by mesne assignments, to Opti-Cap Inc., Corpus Christi, Tex., a corporation of Texas Original No. 3,307,620, dated Mar. 7, 1967, Ser. No. 509,503, Nov. 24, 1965, which is a continuation-in-part of applications Ser. No. 355,288, Mar. 27, 1964, and Ser. No. 490,505, Sept. 27, 1965. Application for reissue Aug. 16, 1968, Ser. No. 758,640
Int. Cl. F01p *3/00;* F28f *19/00*
U.S. Cl. 165—51 8 Claims

Matter enclosed in heavy brackets [ ] appears in the original patent but forms no part of this reissue specification; matter printed in italics indicates the additions made by reissue.

*ABSTRACT OF THE DISCLOSURE*

*An engine cooling system with a flexible element to compensate for expansion and contraction of the coolant in the system. A retainer surrounds the element to limit the extent of expansion of the element and thereby insures pressure buildup in the system to increase the boiling point of the coolant, after the coolant expands a predetermined amount as a result of heating. An overpressure valve protects the system against excessive pressures. A vacuum valve is set to open only after a vacuum sufficient to insure collapse of the flexible element occurs in the system. When the system operates properly the vacuum valve does not open. Thus, upon cooling of the coolant, with corresponding contraction, the decrease in volume of the coolant is compensated for by the flexible element without introducing air into the system. The flexible element is preferably a deformable sac.*

The present invention is a continuation-in-part of my copending application Serial No. 355,288, filed March 27, 1964, entitled, Tank Viewer and Injection Fitting, *and now Patent No. 3,276,488 granted Oct. 4, 1966* and for application filed September 27, 1965, entitled, Closure for Pressurized Fluid Tank, Serial No. 490,505 *and now Patent No. 3,393,717 granted July 23, 1968.*

This invention is concerned with an expandible sac for use in conjunction with the coolant system of an automobile or like system. It is primarily intended as an expansion-contraction absorber, where it is desired to seal the contents of the coolant system from the atmosphere.

This is particularly important where the coolant is subjected to hot and cold temperature extremes and therefore expands and contracts. The expansion and contraction of the coolant may produce an undesirable variance of pressure above or below atmospheric pressure within a given expansion-contraction range. However, the increase in pressure may be desirable when the given range is exceeded.

My expandable sac may be in the form of a bag, or comprise part of the radiator tank. It may also comprise the radiator hose, in which case it would expand and contract freely to a point and would simultaneously conduct the liquid coolant within the system.

Conventional automobile pressure coolant systems generally comprise a semi-rigid radiator to dissipate heat from coolant; a water pump to circulate cooled coolant from the radiator through the engine block and back to radiator; a fan; a thermostat that forceably prevents circulation from engine block back to radiator until a desired temperature is reached, and which then opens and allows circulation through the radiator; a pressure cap to control the developed pressure; and two flexible hoses which simultaneously conduct coolant to and from radiator, and prevent engine movement and vibration from being transmitted to the radiator. The entire system is semi-rigid so that when it is sealed, expasion of the coolant produces pressure, and contraction of the coolant produces a vacuum, automatically.

Atmospheric coolant systems differ from the above in that they do not have a pressure cap, and are freely open to the atmosphere. Thus, they do not produce pressure upon expansion and contraction of the coolant. However, the coolant may evaporate, thus causing coolant loss. Also, the coolant may boil freely at normal atmospheric pressure, thus causing coolant loss and subsequent loss of cooling capability. The advantage of this system is it is not subjected to significant internal pressures, and therefore components are subjected to less strain and generally have a longer functional life.

Pressure system differ from atmospheric systems in that they are substantially sealed from the atmosphere by a pressure cap. The cap is basically a one-way spring loaded seal, biasing an opening in the radiator tank, is calibrated so as to give to any interior pressure that exceeds approximately 15 pounds (current systems ratings). Thus, when the cap is used, coolant expansion due to engine heat, causes a building up in interior pressure, but causes an exhaust when over-pressure develops.

Conventional automobile pressure cooling systems utilize the principle that for every pound of pressure maintained on the coolant, boiling can be delayed approximately 3 degrees past the normal boiling point. Hence, coolant with 15 pounds pressure exerted against it may still remain in the liquid phase, thereby retaining its capacity to be pumped by a centrifugal type pump. Thus, it retains its capacity to absorb heat from something hotter, even though it may be super heated past normal atmospheric boiling point, for example, to 245° F. The coolant is therefore efficient provided it is maintained under the proper pressure. The pressure system thus effects safe cooling to a higher temperature than non-pressure or atmospheric cooling systems could effect. Thus, today's engines equipped with a 15 pound pressure system may operate safely at temperatures of approximately 240° F.

Most pressure caps additionally comprise a one-way vacuum relief valve coming into the system. Some are held open by weights, and the air freely enters and exits through an open port until boiling occurs and escaping steam pops the valve closed. Further coolant expansion then creates interior pressure.

Others are spring loaded to hold up their own weight and thus effect a seal, even when no pressure is in system. However, the spring is calibrated to give inwards at the slightest negative pressure or vacuum created by coolant shrinkage, after having been popped closed during the coolant expansion stage. Thus, it equalizes pressure and eliminates vacuums by allowing a system to recharge with outside air, upon coolant shrinkage.

Pressure caps equipped with weighted vacuum relief valves, while allowing free expansion and contraction of the coolant to a point, without pressure buildup, are not sealed from the atmosphere. Thus, coolant can be lost to the atmosphere, and air can freely enter into the system.

Pressure caps that are equipped with spring biased vacuum valves substantially seal the system from atmosphere, but due to the fact that such caps cause the system to be recharged with air as it relieves the system vacuum, the rigid nature of the system causes a pressure to be generated with any slight coolant expansion, even though no pressure is desired. In fact, such caps could build presure equal to the cap rating before the engine is hot enough to open the thermostat. This places the burden of pressure on cooling system parts long before boiling point is reached. Furthermore, the pressure cap and thereby the system does not have a reserve capacity for further expansion since its capacity is utilized in the lower temperature ranges. A further increase in temperature will pop off the cap, releasing overpressure, and since it is common for rapidly circulated coolant to aerate or foam, filling even the air spaces in the heater and radiator top tanks, coolant will be released.

As a specific example, a driver may start his car in the morning with a coolant temperature of 70° F., and equal inside and outside pressure because of the anti-vacuum spring loaded valve. As soon as the engine creates heat sufficient to warm the coolant 5°, a small amount of pressure has been generated through coolant expansion. Since engines operate with a thermostat that prevents circulation through the radiator until a desired minimum temperature is reached, usually 180° F., coolant expansion occurs between 70° to 180° F., which is generally sufficient to give an internal pressure on a modern functional system of approximately 10 to 12 pounds, depending upon the height of fill.

As the engine is driven under variable loads, speeds, and temperature conditions, the coolant temperature generally reaches a point where its expansion causes the pressure to exceed the pressure cap's rated capacity. The cap will then exhaust the excess pressure, generally composed of a certain amount of coolant. If variable load conditions have not created sufficient pressure to pop off the system, then generally, when the engine is stopped, it loses the heat dissipating capacity of the water pump and fan. The latent heat in the engine will be absorbed into the coolant, further increasing its volume. This practically insures its popping off, causing a loss in pressure and coolant. This is especially true with cars equipped with automatic transmissions and air conditioners operating in warm climates.

Because of its rigid nature and the fact that it popped off and now contains less coolant than it did when it was started, a partial vacuum will be created inside the system which today's vacuum valve immediately relieves, thereby recharging the system with air. The system then is ready to repeat its cycle. The purpose of this illustration is that the cooling system had developed a pressure almost equal to its predetermined, excessive pressure limit, before the thermostat even opened at 180° F. and allowed cooling to begin. It also built this pressure in advance of the time in which it is needed to prevent boiling, 212° F. at atmospheric pressure. In short, it built almost excessive pressures at temperatures considered safe for engines operating with non-pressure atmospheric systems. Consequently, this system has little reserve to retain its coolant, or to prevent pop off during its expected normal, superheated (past 212° F.), but safe higher temperature operating ranges.

These built in actions of conventional rigid pressure systems are a deterrent to a sealed system, in that they cause pop off in what is now considered normal heat range cycling of the temperature extremes encountered in the average modern cooling system. These pop offs release coolant, which sooner or later necessitates adding more coolant.

Another disadvantage is that the coolant system is subjected to the stresses of pressure which contribute to its early failure. This occurs almost instantly with any temperature increase, even though the temperature is within the normal operating range of 180° F. of conventional engines. (The portion of the time during which conventional engines operate at temperatures of 212° F. or higher, normally is of short duration.) These factors are a deterrent to a sealed system.

This invention concerns an element which, when placed in a sealed system, allows free expansion and contraction to a given limit. When the given expansion limit is exceeded, further expansion is prevented thereby creating pressure buildup; when the given contraction limit is reached, a vacuum is created.

*In addition, the invention relates to a completely liquid filled engine cooling system which remains sealed during normal operation and in which a flexible element is in fluid communication with the liquid coolant therein and allows free expansion and contraction of the coolant within predetermined limits, during heating and cooling of the coolant. When the predetermined expansion limit is reached, the flexible element is contained against further expansion and a desirable pressure buildup occurs which increases the boiling point of the coolant. Overpressure is prevented by the pressure release radiator cap. Upon cooling, the coolant contracts and a vacuum is created which assures that the flexible element will contract with the coolant and maintain the system full of liquid. A vacuum relief valve used with the system assures the creation of a vacuum sufficient to cause collapse or contraction of the flexible element upon cooling of the coolant, but the vacuum relief valve will open in response to excessive vacuum to prevent damage to, for example, the radiator of the cooling system, which could collapse from excessive vacuum.*

When installed in a cooling system where the expansion and contraction factor is known, as in automobiles, and when calibrated to that factor, the element acts as an absorber. Thus, it delays the time at which expansion creates pressure and consequently the popping off cycle. Properly calibrated elements would cause pop off only in case of severe malfunctions and not during normal or slightly higher than normal temperatures.

Besides relieving the coolant system of pressure stresses in its normal heat range, the element also provides an equal amount of contracting movement without building a significant amount of vacuum.

To insure that a vacuum is created when the coolant shrinks in systems utilizing my element, the instant vacuum breaking valves of conventional pressure caps should be recalibrated to hold an interior negative pressure or vacuum of approximately 1 to 3 pounds, depending on the strength of the system.

This is a simple adjustment, but insures a partial vacuum while still guarding against over vacuum. Caps so modified could then be utilized in my system. Thus, when a car utilizing my system with the element contracted and under an initial light vacuum, and with a coolant temperature of 70° F., is started, the initial vacuum as well as the space provided by element must be filled before a pressure can be generated. Consequently, instead of having a 10 to 12 pounds of pressure in my system when the normal operating temperature of approximately 180° F. is reached, my system may have none, although the element is expanded to its limit. Then, when the temperature further increases further expansion creates pressure to detain boiling; but the pressure is created at a time when the system is more able to contain it. In this manner, it extends the system's pressure retentive capacity. For all practical purposes, pop off then occurs only in case of a malfunction. On cooling of the coolant, the element contracts again, displacing the coolant back into the rigid parts of the system by virtue of the natural tendency of the pliable element to collapse, and again creates a vacuum. The expansion-contraction cycle is thereby completed.

The initial vacuum may be generated by bringing the system to operating temperature before installing the pressure cap. The system will also generally create a vacuum automatically following the first time it cools after popping off.

Sealed systems may be designed using my element. Due to the delicate balance of cooperating parts of a conventional pressure system, and to the temperature extremes under which it normally operates, a pressure cap may be preferred. If so, a capping means such as described in my U.S. Patent No. 3,211,321 equipped with the modified vacuum breaking valve heretofore described may be used. Also the pressure caps described in my co-pending applications Nos. 355,288 or 490,505, equipped with injection valves, capable of retaining adequate operating vacuum, may alternatively be used.

The systems would have all the before mentioned improvements, in addition to the fact that it could be visually checked, whether under pressure or not, without opening. Also, coolant could be injected full without opening the sealed system. This coolant system thus requires a structure which continually and freely expands and contracts to its limits as the engine heats and cools, respectively.

To conveniently modify existing systems to include my element, I have designed a new radiator hose to expand and contract freely to its limits, to continue to contain and transmit coolant, and to more readily fit varying diameters of coolant systems, thereby eliminating the need for a mechant to stock many special sized and shaped hoses. These elements also give visual indications of the pressure that may be contained in a sealed cooling system, thus warning of possible danger.

It is therefore an object of this invention to provide a coolant system which can operate at a higher coolant level in the header tank when cold, but at a lower pressure when hot, than corresponding conventional systems; and which is completely sealed, thereby precluding the loss of any coolant.

It is another object of invention to provide an automatic non-rigid expansion and contraction joint that will contain varying pressures and limit the vacuum created during the various cycles and conditions of engine operation, and for different temperature ranges.

It is another object of this invention to control the time at which pressure is allowed to be generated, thereby protecting the system from pressure stresses until such time as it is desired, thus providing pressure generation to coincide with the necessity for said pressure and simultaneously extending the life of said system.

It is another object of invention to provide a truly sealed cooling system, operating with normal engine stress and temperature limits and ranges, without benefit of other pressure regulating means or a pressure cap.

It is another object of invention to provide a coolant system which is completely sealed and which provides means for indicating the coolant level without having to break said seal.

It is another object of invention to prevent the loss of vacuum in amounts necessary to guarantee collapse of the element thus providing an element that is automatically operable by both pressure and vacuum forces, if said system is equipped with a vacuum relief valve or its equivalent.

*It is another object of the invention to provide a sealed engine cooling system utilizing a vacuum responsive valve which allows a vacuum greater than 1 p.s.i. to occur within the system to guarantee collapse of the flexible element thereby preventing air from entering the system during normal expansion and contraction of the coolant in the system, while still protecting the system against excessive vacuum as a result of abnormal contraction of the coolant.*

It is another object of invention to provide a visual warning alert that pressure is present in system, thus avoiding surprise.

It is another object of invention to provide an element that contracts and expands freely in the form of a radiator hose, adaptable to fit various shapes and sizes of connectors, thus allowing simple conversion of existing systems to my expandible system by mere replacement of one part.

These and other objects of the invention will be apparent from the following specification and drawings in which.

Figure 4:
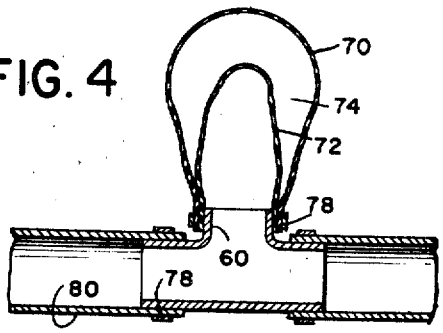
FIGURE 4 is a sectional view of a particular type of species of expansion sac.

FIGURE 4 illustrates the basic design for the expansion sac which I have developed for use in a sealed coolant system. The sac is basically a two part unit comprising a thin, soft and pliable inner-lining or bladder 72, which is independent from the outer lining 70. The outer retainer lining 70 comprises a strong type of material, which may be in the form of a mesh, and which is porous and open to atmosphere.

As illustrated, the expansion sac, which comprises inner wall 72 and outer wall 70, may be mounted by T connection 60, by clamps 78 or by equivalent means to heater hose 80. Inner wall 72 contains the fluid, which flows through heater hose 80. The expansion sac may be located in the heater hose as illustrated in FIGURE 4. However, it could be connected at any other place within the coolant system, if this is desired, such as at the engine water jacket. Inner lining 72 independently collapses to relieve an internally created vacuum in the sealed coolant system, while outer liner 70 remains in place, to be ready to contain the inner-liner when an interior vacuum state changes to an interior pressure state. Space 74 comprises expansion and contraction space, no significant pressure or vacuum is generated therein. Although FIGURE 4 shows one possible shape of the sac, it is apparent that the shape and size may vary greatly, as desired.

Figure 2:
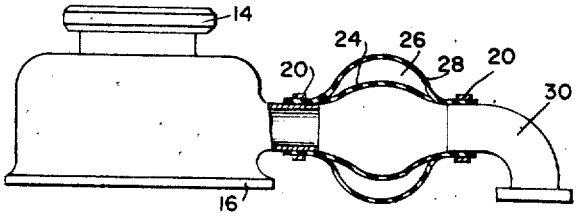
FIGURE 2 is a sectional view of the tank and radiator system, illustrating how a novel hose section or sac is coupled to the radiator and thermostat housing.

FIGURE 2 illustrates another species of the expansion sac for use in a car in lieu of a short radiator hose. In this particular species the expansion sac forms a sealed connection between the tank 16 and thermostat housing 30, thereby increasing the expansion area, as compared to the original smaller diameter radiator hose. It is mounted by clamps 20 which securely mount inner wall 24 and outer wall 28 to the tank and housing. The larger diameter sac gives systems with normally short hoses much greater relative expansion and contraction capacity. It is also possible to use an adjustable band around the outer retaining wall 28 to further control the internal pressure. That is, the band could be made adjustable so that it expands to only a limited extent. Such a band could be used in all species of my invention.

FIG. 2 is shown connected to radiator tank 16 and thermostat housing 30 by clamps 20 in the usual manner. The figure species is particularly useful where long radiator hoses are practicable.

Figure 1:
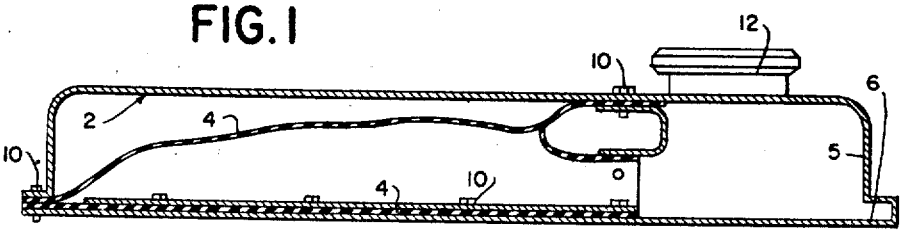
FIGURE 1 is a sectional view of a radiator tank which uses an expansion and contraction unit as part of the radiator tank.

FIGURE 1 illustrates still another embodiment of the expansion sac, in which the expansion sac comprises part of the radiator tank. Thus, the outer edge of bladder 4 is bolted between core 6, tank 5 and retainer 2 by bolts 10. The inner bladder 4 between core 6 and the outer retaining wall 2 comprises the expansion sac. The outer retaining wall 2 is vented to the atmosphere, and cap 12 may or may not comprise a pop off valve, as desired. The system operates just as the species of the expansion sac disclosed in FIGURES 2 and 4, that is, as expansion occurs, bladder 4 will expand, but will not build pressure until contained by outer retaining wall 2. From that point on, further heat causes further coolant expansion which, contained by outer retainer, causes pressure generation. As shrinkage occurs, the bladder 4 will collapse.

A system equipped with an expansion sac may also include a "pop off" overpressure and injection valve, but this is not mandatory. Vacuum relief valves which are used in conventional systems may also be used, although these are not preferred. Of the two commonly used types, one is held in sealed position with very light spring pressure, the biasing of the spring being enough to overcome the weight of the valve, but not enough to resist the slightest negative or below atmospheric pressure. If such a relief valve is used, it may not cause sufficient collapse of the expansion structure. The system may then be recharged with air needlessly, negating the expansion sac's potential efficiency. There is a natural tendency for the pliable sacs to collapse or follow the coolant during its shrinking stage, especially when located in the higher parts of the system, to a certain limit. Once this limit is reached, a further shrinkage produces a vacuum which if not held, would not guarantee collapse of the pliable sac to its limit. This could result in free expansion capacity of less volume than those warranted by the size of the expansion sacs.

Another type of relief valve utilizes the weight of the valve to keep it unseated, opening the system to the atmosphere until the boiling of the coolant creates internal pressure which, in escaping through the valve vent, pops the valve closed thereby creating a sealed system. This kind of relief valve would probably allow said sealed cooling system to recharge with air; also the expansion sac may not collapse fully. Furthermore, because it is force vented, it does not operate until the boiling point is reached, and the system is therefore not sealed but is, at least, partially an atmospheric system.

Figure 3:
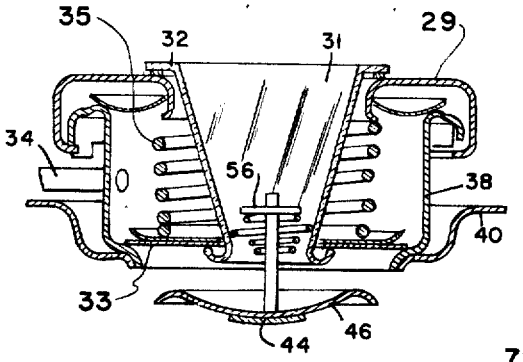
FIGURE 3 is a sectional view of a type of valve that may be utilized with the expansion sac.

I therefore prefer to use an injection type valve of the types described in my co-pending applications Serial Nos. 490.505 and 355,288, *now Patents 3,393,171 and 3,276,488, respectively*. One type is spring biased as illustrated in FIG. 3, *and takes the form of a radiator cap 29*. This type of system includes a valvular control exhaust system which is adapted to either overfilling or overpressure within the system, while at the same time including a uni-directional valvular control for filling the system, and provisions for visual coolant inspection without opening system. To explain, reference is made to the assembly 44 including the concave valve element 46 and stem 48 to which is affixed a spring normally biasing valve element 56 against contact with the interior of the viewing cone 32. Liquid coolant is injected into the system through chamber 31, be means of an injection nozzle thereby compressing the valve spring to open the valve system. Noteworthy is the fact that by this filling action, the possibility of overfilling or overpressure is not effected by the filling in view of the fact that the control gasket *33* may be unseated upwardly *against the action of overpressure compression spring 35* to exhaust excessive overpressure or overfill through port 34. *The control gasket 33 and compression spring 35 function as the usual pressure release valve when overpressure in the cooling system occurs due to abnormal operation, such as boiling of the coolant due to overheating of the system*. The relative size of the injection nozzle or filling tube, not shown, is unimportant here because the conical interior of the viewer will accommodate a variable number of sizes of hose, as will be apparent.

The other types of valves as described in my above co-pending applications Serial Nos. 490,505 and 355,288 may also be utilized if modified.

Figure 5:
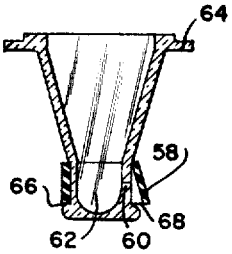
FIGURE 5 is a sectional view of still another type of valve which may be used in conjunction with the expansion sac.

FIGURE 5 illustrates another type of valve, which is also disclosed in my co-pending applications Serial Nos. 490,505 and 355,288. In this instance the conical wall 66 of the viewer terminates in a closed bottom 62 which defines bore 60, adapted as shown, to exhaust the injected filling fluid, which is injected through the injection nozzle into the interior of the tank. Valve 58 comprises a circular and flexible sleeve or diaphragm which is adapted to be forced open upon injection of the coolant liquid into the system but to seal the substantially contiguous cylindrical bottom wall of the viewer. When injection pressure ceases, valve 58 closes of its own tension, fortified with interior pressure, and additionally, with a mechanical spring band, if desired.

However, it is apparent that any other of the injection valves disclosed in my co-pending applications Serial Nos. 490,505 and 355,288, may be used, but they should be adjusted to open not at equal inside and outside pressure, but at an internal pressure safely less than outside pressure. This ensures a collapsing vacuum inside, and the injection or vacuum valve would only open when an extreme, unsafe vacuum occurs. It also increases the no-leak value of the seal when internal pressure occurs. If desired, the valve may be located in the expansion sac.

One can also utilize the viewer caps which have been disclosed in Patent No. 3,211,321 and in my co-pending applications identified above, which together with said expansion element sealed coolant system, makes the coolant easily viewable when it has expanded, because its level is higher. Furthermore, when the coolant cools and thereby shrinks in volume, the level becomes lower. However, with the expansion element the coolant that was contained in the upper hose or sac is displaced back into the tank by the action of the vacuum collapsing, the hose or sac thereby raising its level and making it still easily viewable. Thus the coolant level and air cushion in the radiator header tank remains relatively constant, hot or cold.

Figure 6:
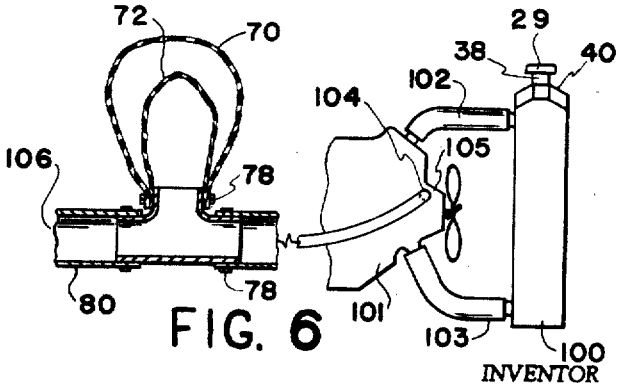
*FIGURE 6 is a view, partly in section, showing the expansion and contraction device of FIG. 4 connected to a typical engine cooling system.*

*FIG. 6 shows the expansion and contraction device of FIG. 4 connected to a typical engine cooling system including a radiator 100, an internal combustion engine 101, and the usual upper radiator hose 102 and lower hose 103 interconnecting radiator 100 with the cooling jacket of the engine. Heater hose 80 has an end 104 that is connected to the cooling system at a fitting which may extend from water pump 105, depending of course on the vehicle manufacturers construction and heater connecting arrangement. End 106 of the hose is connected to the heater (not shown) of the vehicle. The expansion and contraction device is readily installed merely by cutting the heater hose 80, inserting T connection 60 in the ends of the hose, and mounting the bladder 72 and outer wall 70 on the connection 60. Clamps 78 are used to secure the hose ends and the expansion-contraction device to connection 60. Mounted on neck 38 at the top of header 40 of radiator 100, is radiator cap 29, which releases to exhaust overpressure in the system, because of the action of spring 35 on gasket 33, and allows a vacuum to occur within the system to assure that coolant in bladder or sac 72 is drawn back into the engine block or radiator when the coolant cools and contracts. As previously explained, the vacuum valve 46 opens only when the vacuum in the system becomes excessive, and hence, air is not drawn into the system each time the engine cools and the coolant contracts.*

The inner liner of the radiator hose for example could be made of translucent material, of which many types are presently commercially available. Such materials are not used in these applications today because generally they lose their strength when subjected to high heat and may fail when required to resist pressure. However, in my expansion elements only the inner liner is required to flex; the outer retainer resists the pressure. Therefore the material is suitable for this application. The system could then be checked without opening, filled without opening, and its operating pressure could be lowered to coincide with the times at which it is needed.

A translucent version of the upper hose, when used with today's standard pressure cap, would effect a system that would provide everything but injection, and would be far superior to present day systems. All that would be necessary would be to modify the vacuum release valve to hold some vacuum before opening. This is a simple matter of increasing the tension that holds the valve closed.

To visually check a system to determine if interior pressure is present all one must do is observe the expansion sac or hose. If positive pressure is present, the flexible inner liner will be inflated to its limits[, as will the elements that are integrally bonded]. If no pressure or a vacuum is present, the element will be in a collapsed state. These elements thus afford visual proof of interior pressure conditions and thus perform as a warning alert.

Thus the element may be placed in a sealed coolant system, either in the form of a sac or of a radiator tank, in lieu of existing tanks or a part [of] thereof; or in the form of a radiator hose, in lieu of conventional hoses. When such a system is further provided with a pressure cap, having a vacuum relief valve adjusted to withstand an interior sub-atmospheric pressure of at least 1 to 3 pounds, the system then is sealed from the atmosphere and automatically operable and self adjusting as climatic conditions and engine temperatures vary. Such a sealed system would have a greatly extended operating range as compared to a conventional sealed pressure system of corresponding size and liquid fill.

The sealed coolant system solves the most prevalent reasons for coolant loss and early system fatigue in conventional pressure systems. That is, it eliminates the necessity of opening the system to check the water, by virtue of the translucent inner liner of the hose or the viewing pressure cap. It also eliminates pressure during the most frequently used interval of car operation because of the expansion element thus lengthening system life. And by delaying the generation of pressure the point at which the system reaches its capacity is delayed, thus avoiding unnecessary pop offs because of the expansion element.

By reducing the pressure to nil during the normal temperature range of operation, coolant loss due to opening the system (when not provided with a viewer cap) to check contents level is eliminated. Today's sealed pressure system blows coolant out under pressure when opened to inspection, even if it is below atmospheric boiling point. When not under pressure, coolant is not forced out. If pressure is present, coolant may be past 212° F. and if the system is opened to the atmosphere, the usual 4–5 gallons of coolant would then boil and erupt violently, thereby creating a dangerous hazard. Thus, the extended range of this sealed system is so adaptable that the pressure cap or its vacuum valve would only be required to function in case of an extreme climatic change or a malfunction. It thus overcomes the major deterrent to a sealed system.

Having thus described my invention I claim the following:

1. In an engine cooling system wherein a coolant is circulated from engine to radiator, a vacuum relief device, comprising:

(A) attachment assemblies permitting said device to be installed between the engine and radiator, said attachment assemblies being of predetermined cross-sectional area;

(B) a flexible coolant conductor interposed between said attachment assemblies for circulating coolant through said system, including:

(i) a deformable sac interposed between and secured to said attachment assemblies, said sac having a cross-sectional area which in part is greater than that of said attachment assemblies permitting inward contraction from its normal position upon the creation of a vacuum within said system as the coolant varies in temperature, and (ii) an outer lining separate from and generally surrounding said deformable sac, said outer lining containing the expansion of said deformable sac as the vacuum state within said system changes to a pressure state.

2. In an engine cooling system wherein a coolant is circulated from engine to radiator, a vacuum relief device, comprising:

(A) an attachment assembly permitting said device to be installed within the cooling system, said attachment assembly having an opening of predetermined cross-sectional area;

(B) a flexible coolant conductor secured to said attachment assembly at said opening for circulating coolant through said system, including:

(i) a deformable sac having a cross-sectional area which in part is greater than that of said opening of said attachment assembly permitting inward contraction from its normal position upon the creation of a vacuum within said system as the coolant varies in temperature; and (ii) an outer lining separate from and generally surrounding said deformable sac, said outer lining containing the expansion of said deformable sac as the vacuum state within said system changes to a pressure state.

*3. In an engine cooling system wherein a coolant is circulated from engine to radiator, a vacuum relief device, comprising:*

*(A) an attachment assembly permitting said device to be connected to said cooling system in fluid communication with the coolant therein, said attachment assembly having an opening of predetermined cross-sectional area;*

*(B) a flexible coolant conductor secured to said attachment assembly at said opening, and in fluid communication with the coolant in said system, said coolant conductor comprising*

*(i) a deformable sac having a cross-sectional area which in part is greater than that of said opening of said attachment assembly permitting inward contraction thereof upon the occurrence of a vacuum within said system created by variations of coolant temperature;*

*(C) an outer lining generally surrounding said deformable sac, said outer lining containing the expansion of said deformable sac upon the occurrence of pressure within said system created by variations of coolant temperature.*

*4. A cooling system according to claim 3 wherein said deformable sac is an axially elongated tubular element; and*

*said outer lining is separate from and completely encircles said deformable sac,*

*5. In a sealed engine cooling system wherein coolant circulates from engine to radiator and wherein air is not drawn into the system each time the coolant cools,*

*(A) means to compensate for expansion and contraction of the coolant in said system without loss of coolant from said system, said means comprising*

*(i) an attachment assembly connected to said cooling system in fluid communication with the coolant therein, said attachment assembly having an opening of predetermined cross-sectional area*

*(ii) a flexible coolant accommodating element secured to said attachment assembly at said opening, and in fluid communication with the coolant in said system, said flexible element comprising*

*(a) a deformable sac having a cross-sectional area which at least in part is greater than that of said opening of said attachment assembly;*

*(iii) an outer wall generally surrounding said deformable sac, said outer wall containing the expansion of said deformable sac upon the occurrence of pressure within said system created by variations of coolant temperature; and*

*(B) valve means in fluid communication with said coolant to maintain a predetermined vacuum within*

*said system upon cooling of said coolant, and to open in response to vacuum in said system greater than a predetermined value, whereby collapse of said deformable sac is assured and the system is protected against excessive vacuum;*

*whereby, the cooling system is protected against excessive vacuum while assuring the creation of a sufficient vacuum to cause the deformable sac to collapse thereby preventing drawing air into the system each time the coolant cools.*

*6. A cooling system according to claim 5 wherein*

*said deformable sac is an axially elongated tubular element; and*

*said outer wall is spaced from and completely encircles said deformable sac.*

*7. In a sealed engine cooling system wherein coolant circulates from engine to radiator and wherein air is not drawn into the system each time the coolant cools,*

*(A) means to compensate for expansion and contraction of the coolant in said system without loss of coolant from said system said means comprising*

*(i) an attachment assembly connected to said cooling system in fluid communication with the coolant therein, said attachment assembly having an opening of predetermined cross-sectional area*

*(ii) a flexible coolant accommodating element secured to said attachment assembly at said opening, and in fluid communication with the coolant in said system, said flexible element comprising*

*(a) a deformable sac having a cross-sectional area which at least in part is greater than that of said opening of said attachment assembly;*

*(iii) an outer wall separate from and generally surrounding said deformable sac, said outer wall containing the expansion of said deformable sac upon the occurrence of pressure within said system created by variations of coolant temperature;*

*(B) valve means in fluid communication with said coolant to maintain a predetermined vacuum within said system upon cooling of said coolant, and to open in response to vacuum in said system greater than a predetermined value, whereby collapse of said deformable sac is assured and the system is protected against excessive vacuum; and*

*(C) pressure release means in fluid communication with said coolant to release excessive pressure from said system upon the occurrence of abnormal pressures within said system;*

*whereby, the cooling system is protected against excessive pressure and excessive vacuum while assuring the creation of a sufficient vacuum to cause the deformable sac to collapse thereby preventing drawing air into the system each time the coolant cools.*

*8. A cooling system according to claim 7 wherein*

*the radiator of the cooling system has a neck; and*

*said pressure release means is a valve mounted on the neck of the radiator and normally sealing said system.*

References Cited

The following references, cited by the Examiner, are of record in the patented file of this patent or the original patent.

UNITED STATES PATENTS

| | | | |
|---|---|---|---|
| 2,147,699 | 2/1939 | Hardiman | 165—134 X |
| 3,208,438 | 9/1965 | White | 165—181 X |

FOREIGN PATENTS

| | | |
|---|---|---|
| 1,022,105 | 1/1958 | Germany. |

ROBERT A. O'LEARY, Primary Examiner

C. SUKAL, Assistant Examiner

U.S. Cl. X.R.

123—41.5; 165—134